Figure 1:
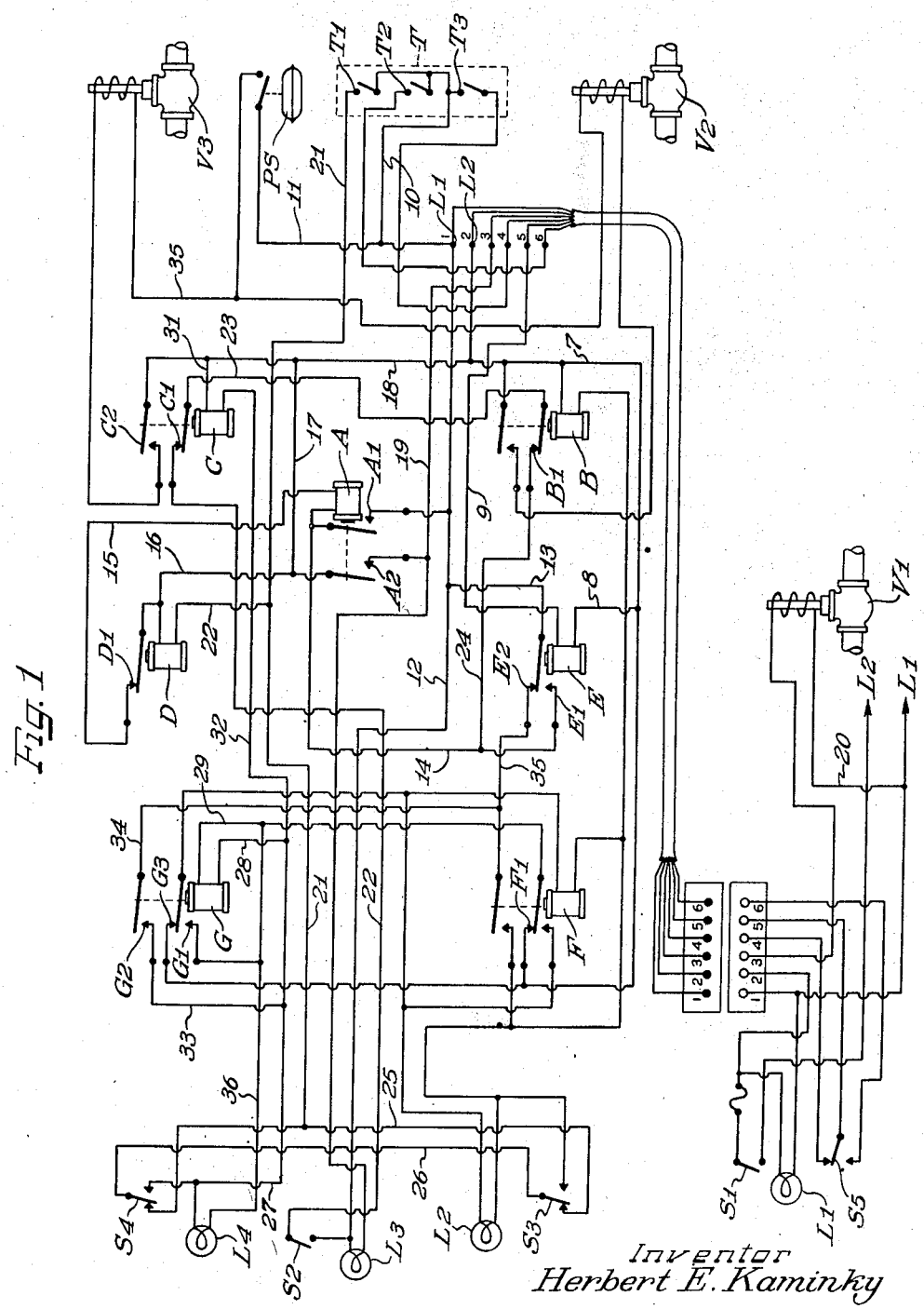

Nov. 22, 1949         H. E. KAMINKY         2,488,817
CONTROL FOR AUTOMATIC COFFEE URNS
Filed Aug. 13, 1948                                2 Sheets-Sheet 2

Inventor
Herbert E. Kaminky by The Firm of Charles Hill Attys

Patented Nov. 22, 1949

2,488,817

UNITED STATES PATENT OFFICE 2,488,817

CONTROL FOR AUTOMATIC COFFEE URNS

Herbert E. Kaminky, Chicago, Ill.

Application August 13, 1948, Serial No. 44,097

14 Claims. (Cl. 137—68)

This invention relates to an improved control system for controlling the operation of an automatic coffee urn of the type utilized in restaurants, hotels and similar institutions.

Many control arrangements have heretofore been proposed for effecting the control of the supply of cold water to the heating chamber of a coffee urn and the transfer of hot water from such heating chamber to the coffee brewing chambers so that the coffee brewing operation, when once initiated, may be carried out automatically without requiring attention on the part of the operator. However, all such known control arrangements have been unsatisfactory, either due to the fact that they were not completely automatic in operation but required considerable manual attention and supervision, or by virtue of the fact that careless manipulation of the various controlling switches by an unskilled operator could produce a malfunctioning of the urn which would result in the brewing of coffee of improper strength or, under some conditions in producing a flooding of either the heating chamber or the coffee brewing chambers with the attendant danger of permanent damage to the equipment or injury to the operator.

While not limited thereto, this invention finds particular application to a well known form of coffee urn which employs a single water heating chamber to which cold water is supplied through an electrically operated valve. Such water heating chamber is connected by a plurality of electrically operated transfer valves to an equal number of coffee brewing chambers so that the heated water may be selectively supplied to any one of the coffee brewing chambers.

With a general arrangement of this type, certain operating characteristics are essential for the control circuit to safely and reliably operate under all conditions. In the first place, it is essential that the water level in the water heating chamber be maintained above a certain minimum level, to preclude the possibility of overheating of such chamber due to inadequate water. Furthermore, it is quite desirable that the control arrangement preclude the possibility of the water heating chamber supplying hot water concurrently to more than one of the coffee brewing chambers, due to the fact that if such concurrent supply were permitted to occur, it would be entirely a matter of conjecture as to the amount of hot water supplied to each of the coffee brewing chambers and the strength of the resulting brew would obviously vary considerably. Furthermore, it is quite important that the maximum water level attained in the water heating chamber be reliably controlled so as to prevent flooding of such chamber. Likewise, the amount of hot water transferred to any one of the coffee brewing chambers should be definitely determined, not only to prevent the flooding of the particular brewing chambers, but to insure uniformity of the brewed coffee. Lastly, it is essential from the standpoint of the quality of the brew produced that no transfer of hot water to any one of the brewing chambers be accomplished until a predetermined fluid pressure is established in the water heating chamber, indicating that the water therein is at the proper temperature for brewing purposes.

Accordingly, it is an object of this invention to provide an improved control system for a coffee urn of the automatic type.

A further object of this invention is the provision of a control system for a coffee urn wherein an electrical water level detecting device operates in conjunction with relay elements to insure that a minimum water level will be maintained within the water heating chamber of the coffee urn, and furthermore, to automatically fill the water heating chamber to a predetermined maximum level whenever the water level therein falls to the aforementioned minimum level.

Still another object of this invention is to provide a control system for automatic coffee urns of the type having a single water heating chamber and a plurality of coffee brewing chambers characterized by the interlocking of relays which respectively control fluid transfer valves providing communication between the coffee brewing chambers and the water heating chamber so as to permit only a selected one of the water transfer valves to be opened at any one time.

Another important object of this invention is the provision of a control circuit for an automatic coffee urn wherein the manual initiation of the transfer of hot water from the water heating chamber to a coffee brewing chamber will effect the locking of certain relay elements so as to continue the water transfer operation until a predetermined quantity of hot water is transferred to the coffee brewing chamber, irrespective of the subsequent release or energization of the manual switch.

A particular object of this invention is the incorporation of a water level detecting device in the control circuit of a coffee urn which has a plurality of switches respectively operated at different low levels of fluid, so that the manual selection of a particular low level switch permits the selection of variable amounts of hot water to be transferred to the coffee brewing chambers of the device.

It is a very important object of this invention to provide a control system for an automatic coffee urn which is substantially foolproof and which will safely operate to uniformly brew coffee irrespective of improper control switch actuation that may be inadvertently produced by an inexperienced operator.

The specific nature of the invention as well as other objects and advantages thereof will become apparent to those skilled in the art from the following detailed description of the annexed sheets of drawings which, by way of preferred example only, illustrate one specific embodiment of the invention.

Figure 2:
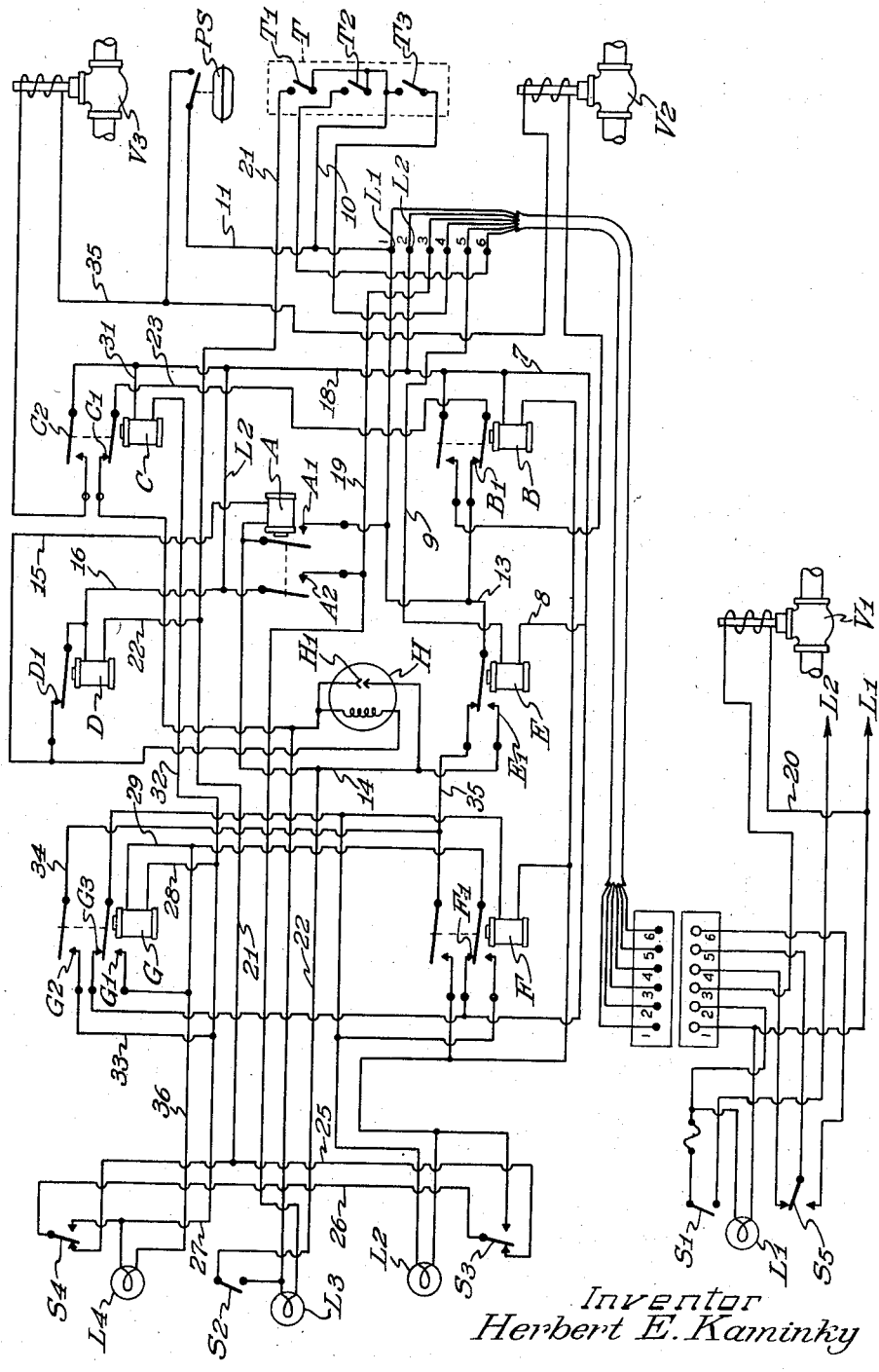

On the drawings:

Figure 1 is a schematic circuit diagram of a control system for automatic coffee urns embodying this invention; and Figure 2 is a schematic diagram of a modified control system for an automatic coffee urn which differs from the circuit arrangement of Figure 1 in that means are provided for automatically refilling the water heating chamber of the urn at any time that the water level drops below a predetermined level.

As shown on the drawings:

As heretofore indicated, the control system embodying this invention may be applied to any one of a variety of well known forms of coffee urns which are commercially available. In a common form of such coffee urns, a single water heating chamber is provided and the supply of fresh water to such heating chamber, which generally constitutes cold water from the ordinary city water tap, is controlled in accordance with this invention by an electrically operated valve V1 which is of conventional construction. The level of water attained in the water heating chamber of the coffee urn is detected by a water level electrical detecting device T, which is here shown as comprising three switches, T1, T2 and T3, respectively, which are operated respectively at the full level of water in the water heating chamber and at two lower levels. For example, the switch T2 may be operated at a half full level, while the switch T3 is operated at a substantially empty level of water in the water heating chamber. The water level indicating device T may likewise constitute any one of several well known constructions, but preferably constitutes a device similar to that described and claimed in my copending application Serial No. 44,098 filed concurrently herewith. A pressure switch PS is appropriately mounted in the water heating chamber and is arranged to close its contacts whenever the fluid pressure in such chamber attains a value commensurate to a temperature of the water therein which is proper for coffee brewing purposes.

A plurality of coffee brewing chambers (not shown) are associated with the water heating chamber in conventional fashion to receive hot water therefrom and to conduct such hot water into intimate contact with coffee grounds disposed in the brewing chambers. In accordance with this invention, electrically operated valves are provided which control the transfer of hot water from the water heating chamber into the coffee brewing chambers. In the particular example illustrated in the drawings, it is assumed that two such coffee brewing chambers are provided and hence electrically operated valves V2 and V3, respectively control the transfer of hot water to such chambers.

As will be later described in detail, the amount of hot water transferred from the water heating chamber to any particular coffee brewing chamber is determined by the difference in water volume corresponding to the full level position in the water heating chamber at which the level indicating switch T1 operates and any selected one of the lower levels at which the level indicating switches T2 and T3 respectively operate. The selection of the desired amount of water for transfer to the coffee brewing chambers is controlled by a manually operable selector switch S5 which has a number of positions equal to the number of low level switches. As shown, the selector switch S5 is manually operable between an upper position wherein the lowest level switch T3 is connected in the control circuit, and a lower position wherein the intermediate level switch T2 is connected in the control circuit.

To manually effect the refilling of the water heating chamber whenever the water level therein drops below the full position, a switch S2 is provided whose operation will be described in detail later. To effect the selection of the particular coffee brewing chamber to which hot water will be transferred, a plurality of manually operated switches, equal in number to the number of coffee brewing chambers are provided which are here shown as the switches S3 and S4. Lastly, a main off-on switch S1 is provided, which controls the connection of the entire circuit to a suitable source of energizing potential indicated as the lines L1 and L2.

The control circuit embodies seven relays which are respectively indicated by the letters A through G. All of the relays shown in the drawings have their contacts indicated in their normal position, corresponding to the deenergized condition of the relay. These relays are interconnected with the electrically operated valves V1 through V3, the water level indicating device T, the pressure switch PS, and the various manually operated switches S1 through S5 in the manner indicated in detail in Figure 1 of the drawings, and the following sequence of control operations may be produced.

The closure of main switch S1 causes the energization of indicating light L1 and applies line potential to line 1 and 2. Assuming that the water heating chamber of the coffee urn is substantially empty of liquid at the time that the off-on switch S1 is closed, and further assuming that the selector switch S5 is set to connect the lowermost liquid level switch T3 into the control circuit, the contacts of the lowermost level switch T3 will then be closed. Hence an energizing circuit is completed for the coil of relay E which may be traced from line terminal 2 through conductor 7 and 8, through the coil of relay E, through conductor 9, through line 5, through selector switch S5, through line 4, through the closed contacts of the lowest level switch T3 through conductor 10, and then through conductor 11 to line 1.

Relay E thereupon shifts its armature to engage contact E1 and to disengage contact E2. Now a circuit is completed for the energization of the coil of relay A which may be traced from line 1 through conductor 12, to conductor 13, through the contact E1 of relay E, through conductor 14, through the coil of relay A, through conductor 15, through the normally closed contacts of relay D, through conductors 16, 17 and 18 to line 2.

The energization of relay A first effects a self-locking circuit for the coil of relay A by the closing of its contact A1 which directly connects the relay coil to the conductor 12 and hence to the line 1. In addition, energization of relay A closes a circuit through its contact A2 and the closure of this contact effects the energization of the water supply valve V1 through the following circuits: from line L2 through conductors 18, 17 and 16 to the closed contact A2 of relay A, through conductor 19 to line 3, from line 3 to the coil of the supply valve V1 and thence by conductor 20 to the line L1.

The opening of supply valve V1 of course produces a flow of fresh water into the water heating chamber of the urn and any slight increase in the water level in the urn effects the opening of the low level switch T3. Such opening of the contact T3 effects the deenergization of relay E but has no effect upon the energization of relay A which is locked in its energized condition by the closing of its contact A1. Hence water will continue to be supplied to the heating chamber until the full or high level switch T1 of the liquid level detecting device T is closed. In this connection, it should be noted that the momentary closure of the intermediate level switch T2 will have no effect on the control circuit because this switch is disconnected from the circuit by the selector switch S5. It is therefore apparent that when initially filling the urn from a completely empty condition, it is necesary that the selector switch S5 be at least momentarily connected to select the lowermost level switch T3. After the relay A picks up, the selector switch S5 may be shifted to its other position to select the intermediate level switch T2 with no effect upon the control operations heretofore described.

Upon the attainment of the full charge of liquid in the water heating chamber of the urn, the full level switch T1 closes its contacts and completes an energization circuit for the coil of the relay D. This circuit may be traced from line 1 through conductor 10, through the closed contacts of level switch T1, through conductors 21 and 22, through the coil of relay D, through conductor 16, through conductors 17 and 18 back to line terminal 2. The energization of relay D immediately effects the deenergization of relay A by the opening of its normally closed contacts D1 which will be recalled to have been in the energizing circuit of the relay A. Hence, when the water heating chamber of the urn is filled with water, only the relay D is energized and all other relays are deenergized.

If desired, an indicating light L3 may be connected in the circuit, effectively in parallel with the coil of relay A, and thus provide an indication whenever the filling operation is in progress. Light L3 is thus connected to one side of the coil of relay A by conductor 12 and to the other side by conductor 19.

Whenever water is withdrawn from the heating chamber, whether for transfer to a brewing chamber or for other purposes, the relay D will be deenergized by the opening of the full level switch T1. However, no other control effect will be produced unless sufficient water is withdrawn to lower the level of the water in the heating chamber to the level corresponding to the selected lower level switch T2 or T3 as the case may be. However, when the level is lowered to that corresponding to the selected low level switch T2 or T3, the control circuit will be immediately operated in the same manner as heretofore described to effect the refilling of the water heating chamber to the full level.

In the event that it is desired to refill the water heating chamber with water when only an amount of water has been withdrawn therefrom which is insufficient to lower the level to that corresponding to the lower level switches T2 and T3, a manually operated refill switch S2 will actuate the control circuit to produce the refilling. Switch S2 has one terminal thereof connected directly to the conductor 12 and the other terminal connected through a conductor 22, through the normally closed contacts C1 of relay C, through conductor 23, through the normally closed contacts B1 of the relay B, through conductor 24, through conductor 14, to one side of the relay coil A. Hence, it is apparent that the relay coil A may be energized by the momentary closing of the refill switch S2 and that once the relay A is energized, the self-locking circuit which is then completed will continue its energization until the water heating chamber is again filled with water up to the level corresponding to that of the full level switch T1, whereupon relay A is deenergized by the energization of relay D in the same manner heretofore described.

Whenever it is desired to transfer heated water from the water heating chamber to one of the plurality of coffee brewing chambers, one of the manual switches S3 or S4 corresponding to the selected coffee brewing chamber is actuated. The closure of switch S3 effects the energization of relays F and B and finally the energization of the solenoid controlled valve V2. Similarly, the closure of manual switch S4 effects the energization of relays G and C and the energization of solenoid controlled valve V3. However, the circuit is so arranged that both valves V2 and V3 can never be concurrently energized. This is accomplished by interlocking connections between the relays F and B and the relays G and C which insures that when one set of relays is energized by actuation of the corresponding switch, the other set cannot be energized until the water transfer operation into the selected brewing chamber has been completed. An additional safety factor is provided in a conventional three wire interconnection of the manual switches S3 and S4 in such manner that the simultaneous depression of both the switches S3 and S4 results in no control effects upon the remainder of the control circuits. Since the operation of relays F and B and their interlocking effects of the relays G and C is identical to the operation of the relays G and C and their interlocking effects on the relays F and B, a detailed description will be provided of the operation of only one set of relays, for example, the relays G and C following the actuation of switch S4.

The operation of manual switch S4 completes an energization circuit for the relay G which may be traced as follows: from the line L1, through conductor 10, through the closed contacts of full level switch T1, (note that the water heating chamber must be initially full in order to effect the following control action) through conductor 21, through conductor 25, through the closed contacts of the other manually operated switch S3, through conductor 26, through the contacts of switch S4, which are closed by its actuation, through conductor 27, through conductor 28, through the coil of relay G, through conductor 29, through the normally closed contacts F1 of relay F, through conductor 7 to line L2. Note that the energization of relay G is interlocked with the relay F by utilization of the normally closed contacts F1 of relay F in the energization circuit.

The energization of relay G in turn effects the energization of relay C, through the following circuit: from line L2, through conductor 18, through conductor 31, through the coil of relay C, through conductor 32, through conductor 33, through the now closed contacts G2 of relay G, through conductor 34, through conductor 35, through the normally closed contacts E2 of relay E, through conductor 13, through conductor 12 to line 1. The energization of relay G also effects the closing of a self-locking circuit through closure of contact G1 and opens contact G3 which is connected in the energization circuit of the relay F. The completion of such self-locking circuit assures that only a momentary actuation of the manual switch S4 is required to start the water transfer operation, and that once started, the water transfer operation will proceed irrespective of subsequent inadvertent release or re-operation of either the manual switch S4 or the manual switch S3.

The energization of relay C completes an energization circuit for the solenoid of the electrically operated valve V3 through the contacts of the pressure switch PS. If the water in the water heating chamber is at the proper temperature for the coffee brewing operation, the contacts of pressure switch PS will, of course, be closed. Such circuit may be traced as follows: from line 1, conductor 11, through the closed contacts of pressure switch PS, through conductor 35, through the solenoid of the electrically operated valve V3, through the now closed contact C2 of relay C, through conductor 18 to line 2. Energization of relay C also effects an interlocking action with respect to the relay A which controls the refilling of the water heating chamber. By opening this contact C1, relay C prevents the energization of relay A at any time while the water transfer operation is in progress. Hence there is no possibility of water being concurrently supplied to the water heating chamber while hot water is being removed therefrom through either of the transfer valves V2 or V3. In this manner, it is assured that an excess of water is not transferred to any coffee brewing chamber.

Water continues to be transferred to the selected coffee brewing chamber through the valve V3 until the water level in the heating chamber drops to the level of the selected low level switch T2 or T3 as the case may be. Incidentally, the initial lowering of the water level and the subsequent opening of the full level switch contacts T1 has no effect upon the condition of the control circuit, since the relay G has theretofore accomplished a self-locking circuit for itself through the normally closed contact E2 of the relay E. However, when the selected low level switch (here assumed to be T2) is operated to close its contacts, the relay E is again energized and the locking circuit for the relay G is broken, thus deenergizing relay G and concurrently deenergizing relay C and hence closing solenoid valve V3. At the same time, the energization of relay E effects the initiation of the refill cycle of operations which was heretofore described.

If desired, indicating lights L2 and L4 may be provided to respectively indicate that a particular brewing chamber is being filled with hot water. The indicating light L4 is connected in parallel with the coil of relay G by conductors 36 and 27 and similar connections are made between the indicating light L2 and the coil of relay F.

In the event that it is desired to transfer hot water to the brewing chamber corresponding to the manual switch S3, an exactly analogous series of control actions are produced with respect to the relays F and B, and the pressure switch PS and the valve V2 as was heretofore described in connection with the operation of the relays G and C, the pressure switch PS, and the valve V3. It is important to note, however, that the interlocking of these two relay circuits completely precludes the possibility of more than one water transfer valve being open at any one time.

From the foregoing description it is apparent that the control circuit of this invention not only assures the automatic and convenient maintenance of the water in the heating chamber at the prescribed full level therein, but insures that a uniform brew of coffee may be selectively produced in any one of the plurality of coffee brewing chambers. The amount of water transferred to any particular coffee brewing chamber is always the same predetermined volume, depending entirely upon the volume of water in the water heating chamber which will reduce the level thereof from the full level, corresponding to the switch T1, to the level of the particular selected low level switch T2 or T3. Furthermore, the described circuit is completely fool-proof and will not malfunction even though the operator inadvertently attempts to operate the refill switch S2 during the water transfer operation, or the transfer switches S3 or S4 during the water filling operation. Hence there is no possibility of flooding of either the main heating chamber or any of the brewing chambers and the apparatus is completely safe, even in the hands of an inexperienced operator.

In the modification of this invention illustrated in the circuit diagram of Figure 2, identical reference characters indicate exactly similar elements as heretofore described in connection with the diagram of Figure 1. In this modification an additional relay H is incorporated in the circuit, having time delay response characteristics, and this relay is so connected as to function to automatically initiate the refilling operation any time that the water level in the water heating chamber drops below the level corresponding to the full level switch T1. It will be recalled that in the circuit diagram of Figure 1, a drop of water level which was not sufficient to bring the level down to that corresponding to the selected low level switch T2 or T3, would not result in any control action. To refill to the full level it was necessary to manually operate the refill switch S2. The addition of relay H to the circuit in the manner indicated in Figure 2 renders the refill switch S2 superfluous and accomplishes automatically the same function accomplished by refill switch S2 when manually operated in the circuit diagram of Figure 1.

Relay H is preferably of any conventional type having time delay response characteristics for the reason that it is not desirable that water be immediately added to the water heating chamber upon the slightest drop of the water level therein from the full level. As is well known in restaurant practice, it is common to withdraw small amounts of hot water from the water heating chamber for purposes other than brewing of coffee. With a time delay characteristic on the order of 15 to 75 seconds, the relay H insures that the refill operation will not be commenced until after any normal withdrawing operation is completed.

It will be understood, of course, that the circuit of Figure 2 has identical characteristics of the circuit of Figure 1 in that the water transfer operation through either of the valves V2 or V3 for coffee brewing purposes cannot be initiated until full water level is restored in the water heating chamber and the proper pressure is produced therein to close the contact pressure switch PS.

It is believed unnecessary to describe in detail the operation of the circuit of Figure 2 since it so closely resembles that of Figure 1. It need only be pointed out that the energizing coil of time delay relay H, which is here shown to be of the heater type relay, is energized at any time that the relay D is deenergized, which condition exists at all times when the level of water in the main heating chamber is below the full level. After a predetermined time delay, the relay H operates to close its contacts H1 which complete an energization circuit for the relay A in the same manner as did the manually operated switch S2 in the circuit arrangement of Figure 1.

It is therefore apparent that both modifications of this invention provide an unusually simple, yet completely reliable and unusually foolproof control circuit for effecting the automatic control of a coffee urn.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A control circuit for a coffee urn having an electrically operated cold water filling valve and an electrically operated hot water transfer valve, comprising, in combination, a water level detecting device having a pair of switches respectively operated at a low and high water level in the urn, a first relay means controlled by said level detecting device for energizing said water filling valve when the water reaches said low level and deenergizing said water filling valve when the water reaches said high level, a manual switch, a second relay means controlled by said manual switch for opening said water transfer valve, and a third relay means responsive to operation of said low water level switch of said water level detecting device for deenergizing said second relay means to close said water transfer valve.

2. A control circuit for a coffee urn having an electrically operated cold water filling valve, and an electrically operated hot water transfer valve, comprising, in combination, a water level detecting device having a pair of switches respectively operated at a low and high water level in the urn, a first relay means controlled by said level detecting device for energizing said water filling valve when the water reaches said low level and deenergizing said water filling valve when the water reaches said high level, a manual switch, a second relay means controlled by said manual switch for opening said water transfer valve, and a third relay means establishing a self-locking circuit for said second relay means, said third relay means being responsive to operation of said low level switch of said level detecting device to break said self-locking circuit, whereby momentary actuation of said manual switch results in discharge of all water from said urn above said predetermined low level through said water transfer valve.

3. A control circuit for a coffee urn having an electrically operated hot water transfer valve comprising, in combination, a water level detecting device having a switch operated at a predetermined low water level, a manual switch, first relay means energized by said manual switch for opening said water transfer valve, and means responsive to operation of said low level switch for denergizing said first relay means, whereby operation of said manual switch automatically discharges all water from said urn above said predetermined low level through said water transfer valve.

4. A control circuit for a coffee urn having an electrically operated hot water transfer valve comprising a water level detecting device having a switch operated at a predetermined low water level, a manual switch, first relay means energized by said manual switch for opening said water transfer valve, means for completing a locked energization circuit for said first relay means, and second relay means responsive to operation of said low level switch for opening said locked energization circuit, whereby momentary actuation of said manual switch results in discharge of all water in said urn above said predetermined low level through said water transfer valve.

5. A control circuit for a coffee urn having an electrically operated cold water filling valve and an electrically operated hot water transfer valve, comprising, in combination, a water level detecting device having a pair of switches respectively operated at a low and high water level in the urn, a first relay means controlled by said level detecting device for energizing said water filling valve when the water reaches said low level and deenergizing said water filling valve when the water reaches said high level, a manual switch, a second relay means controlled by said manual switch for opening said water transfer valve, and means interlocking the energization circuits of said first and second relay means to prevent concurrent operation thereof, and means responsive to actuation of said low level switch for opening the energization circuit of said second relay means, whereby hot water cannot be transferred from said urn while cold water is being supplied thereto.

6. A control circuit for a coffee urn having an electrically operated cold water filling valve, comprising a water level detecting device having an electric switch operated at a predetermined high water level in the urn, a relay means controlled by said high level switch for energizing said water filling valve whenever the water level in the urn drops below said predetermined high level, said relay means incorporating time delay response characteristics, thereby preventing the immediate operation of said water filling valves upon the removal of any water from said urn.

7. A control circuit for a coffee urn having an electrically operated cold water filling valve and an electrically operated hot water transfer valve, comprising, in combination, a water level detecting device having a pair of switches respectively operated at a low and high water level in the urn, a first relay means controlled by said level detecting device for energizing said water filling valve when the water reaches said low level and deenergizing said water filling valve when the water reaches said high level, a manual switch, a second relay means controlled by said manual switch for opening said water transfer valve, and means interlocking the energization circuits of said first and second relay means to prevent concurrent operation thereof, whereby hot water cannot be transferred from said urn while cold water is being supplied thereto, and third relay means controlled by said low level switch for deenergizing said water transfer valve irrespective of the condition of said manual switch, thereby preventing transfer of water from said urn to reduce the water level therein below said predetermined low level.

8. A control circuit for a coffee urn having an electrically operated cold water filling valve and an electrically operated hot water transfer valve, comprising, in combination, a water level detecting device having a pair of switches respectively operated at a low and high water level in the urn, a first relay means controlled by said level detecting device for energizing said water filling valve when the water reaches said low level and deenergizing said water filling valve when the water reaches said high level, a manual switch, a second relay means controlled by said manual switch for opening said water transfer valve, means interlocking the energization circuits of said first and second relay means to prevent concurrent operation thereof, whereby hot water cannot be transferred from said urn while cold water is being supplied thereto, and third relay means controlled by said low level switch for deenergizing said water transfer valve irrespective of the condition of said manual switch, thereby preventing transfer of water from said urn to reduce the water level therein below said predetermined low level, said third relay means also being connected to automatically energize said first relay means to effect the refilling of the urn to said predetermined high water level.

9. A control circuit for a coffee urn having a water heating chamber and a plurality of coffee brewing chambers, comprising, in combination, a plurality of electrically operated valves respectively controlling the transfer of water from said heating chamber to said brewing chambers, relays respectively controlling the energization of said water transfer valve, a manual switch for energizing each relay, means for maintaining each relay energized when its associated switch is closed, means responsive to the actuation of any one manual switch for preventing the energization of all of the other relays, and means responsive to a predetermined low level in said water heating chamber for deenergizing said relay connected to said one manual switch, whereby water may be transferred from said heating chamber to only one of said brewing chambers at any one time.

10. A control circuit for a coffee urn having a water heating chamber and a plurality of coffee brewing chambers, comprising, in combination, a plurality of electrically operated valves respectively controlling the transfer of water from said heating chamber to said brewing chambers, relays respectively controlling the energization of said water transfer valves, a manual switch controlling each relay, means responsive to the actuation of any one manual switch for preventing the energization of all of the other relays, whereby water may be transferred from said heating chamber to only one of said brewing chambers at any one time, a water level switch operable at a predetermined low water level in said heating chamber, and self-locking means for each relay controlled by said low level switch, whereby momentary actuation of any selected manual switch will produce the transfer to the corresponding brewing chamber of all water in said heating chamber above said predetermined low level.

11. The combination defined in claim 9 plus a pressure switch responsive to a predetermined pressure in said heating chamber to close its contacts and having its contacts in the energization circuit of each of said water transfer valves.

12. The combination defined in claim 10 plus a pressure switch responsive to a predetermined pressure in said heating chamber to close its contacts and having its contacts in the energization circuit of each of said water transfer valves.

13. A control circuit for a coffee urn having an electrically operated water level detecting device having one switch operable at the full level of water in the urn and a second switch operable at a lower water level, relay means energized by said low level switch for energizing said water filling valve to open position, means responsive to operation of said full level switch for deenergizing said relay means, whereby removal of water from the urn down to said predetermined low level automatically effects the refilling of the urn, and a manually operable refill switch arranged to energize said relay means independently of said low level switch, whereby said urn may be refilled from any level above said predetermined low level.

14. A control circuit for a coffee urn having a water heating chamber and an electrically operated hot water transfer valve communicating with said chamber comprising, in combination, a water level detecting device having a switch operated at a predetermined low water level, a pressure switch responsive to a predetermined pressure in said heating chamber to close its contacts and having its contacts connected in the energization circuit of said water transfer valve, a manually operable switch, relay means energized by said manually operable switch for energizing said water transfer valve through the contacts of said pressure switch, and means responsive to operation of said low level switch for deenergizing said relay means, whereby operation of said manual switch automatically discharges all water from said urn above said predetermined low level through said water transfer valve, only if such water is at a predetermined temperature.

HERBERT E. KAMINKY.

REFERENCES CITED

The following references are of record in the file of this patent:

UNITED STATES PATENTS

| Number | Name | Date |
|---|---|---|
| 1,346,898 | Kingsbury | July 20, 1920 |
| 1,604,763 | Snyder | Oct. 26, 1926 |
| 1,820,981 | Fever | Sept. 1, 1931 |
| 1,936,051 | Durdin | Nov. 21, 1933 |
| 2,372,448 | Porteous | Mar. 27, 1945 |